United States Patent [19]

Lee et al.

[11] 3,941,621

[45] Mar. 2, 1976

[54] COATINGS FOR FERROUS SUBSTRATES

[75] Inventors: Leonard S. Lee, Daly City; Samuel W. Sopp, Foster City; Howard M. Siegel, Pacifica, all of Calif.

[73] Assignee: Merck & Co., Inc., Rahway, N.J.

[22] Filed: Apr. 21, 1975

[21] Appl. No.: 570,053

Related U.S. Application Data

[60] Division of Ser. No. 521,015, Nov. 15, 1974, which is a continuation-in-part of Ser. No. 360,257, May 14, 1973, abandoned.

[52] U.S. Cl. ................. 148/27; 148/31.5; 148/113; 148/122; 106/52; 427/127; 428/432

[51] Int. Cl.² ...................... B23K 35/24; H01F 1/04

[58] Field of Search ............ 148/27, 31.5, 113, 122; 106/52, 58, 69; 427/127; 428/432

[56] References Cited

UNITED STATES PATENTS

| | | | |
|---|---|---|---|
| 3,697,322 | 10/1972 | Lee et al. | 148/113 |
| 3,765,957 | 10/1973 | Hamachi et al. | 148/113 |

*Primary Examiner*—Walter R. Satterfield
*Attorney, Agent, or Firm*—Hesna J. Pfeiffer; Julian S. Levitt

[57] ABSTRACT

Coatings for silicon steel comprised of MgO, an amorphous magnesia-silica complex and a lithium bearing compound.

2 Claims, No Drawings

COATINGS FOR FERROUS SUBSTRATES

This is a division of application Ser. No. 521,015, filed Nov. 15, 1974, which in turn is a continuation-in-part of U.S. Pat. Ser. No. 360,257, filed May 14, 1973, now abandoned.

This invention relates to coatings for ferrous material and, more particularly, an improved magnesium oxide/magnesium hydroxide coating for grain oriented silicon steel, and the material coated by such process. More specifically, this invention pertains to coating compositions that form a superior insulating film on ferrous metal comprised of MgO, a magnesia-silica complex and a lithium compound, the process of applying said coatings and the steel coated thereby.

In many fields of use and, in particular, in the electrical industry, it is necessary to provide a coating on ferrous material. This coating desirably performs the function of separating and purifying the ferrous material and reacting with surface silica in the steel to form an electrical insulating layer. For example, in the transformer art, the cores of the transformers are usually formed of a ferrous material, such as silicon steel, which may be provided with a preferred grain growth orientation to provide optimum electrical and magnetic properties. It has been found necessary to provide a coating on the ferrous material prior to the final high temperature grain growth anneal. This coating will perform three separate functions. The first function of the coating is to provide separation of the various turns or layers of the coiled material to prevent their sticking or welding together during high temperature anneals. A second function is that of aiding in the chemical purification of the ferrous material to develop the desired optimum magnetic characteristics of such material. The third function of the coating is to form on the surface of the ferrous material a refractory type coating which will provide electrical insulation of one layer of ferrous material from the next during its use as a core in a transformer or in other electrical apparatus such as motor armatures or the like.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium oxide and/or magnesium hydroxide in water. The suspension comprises a quantity of magnesium oxide in water and is mixed sufficiently for the desired application; the magnesium oxide being hydrated to an extent dependent on the character of the oxide used, the duration of mixing and the temperature of the suspension. Therefore, the term magnesium oxide coating is with reference to a coating of magnesium hydroxide which may include magnesium oxide which has not been hydrated.

As set forth in U.S. Pat. No. 2,385,332, in the names of Victor W. Carpenter et al., during a heat treatment at suitable temperatures, magnesium oxide can be caused to react with silica particles on or near the surfaces of previously oxidized silicon-iron sheet stock to form a glass-like coating, which coating is useful as an interlaminary insulator in the use of silicon-iron in electrical apparatus, e.g., in the cores of transformers.

In the production of silicon steel for the magnetic cores of transformers, the steel is generally annealed to provide optimum grain growth and grain orientation which develops the magnetic properties of the silicon steel. This anneal is usually carried out in a hydrogen atmosphere at temperatures ranging from approximately 950° to 1500°C. from about 2 to about 50 hours. This anneal also aids in purifying the steel, aided by the coating placed on the steel. During this anneal a portion of the magnesium oxide coating reacts with the silica on the surface of the silicon steel to form a glass-like coating of magnesium silicate. This glass-like coating provides electrical insulation during the use of the silicon steel in electrical apparatus, e.g., in the cores of transformers.

A number of additives have been proposed in the past to be added to the magnesium hydroxide and/or magnesium oxide in order to improve the $MgO$-$SiO_2$ reaction. For example, U.S. Pat. No. 2,809,137 (Robinson) involves the use of silica to be combined with the MgO for the purpose of improving the insulating properties of the glass-like film obtained after high temperature annealing. U.S. Pat. No. 2,394,047 (Elsey, et al) relates to the use of additives to produce oxidized surface metal and to enhance glass film formation. U.S. Pat. No. 3,697,322 relates to lithium compounds as additives for MgO coatings. Pending U.S. Pat. application Ser. No. 267,276, filed June 29, 1972 relates to magnesia-silica complexes as additives for MgO coatings. In addition to the above, the following U.S. Patents are directed to various materials including silicas and silicates which have been proposed as additives for the coating of ferrous materials. U.S. Pat. Nos. 3,583,887; 3,214,302; 3,562,029; 2,739,085; and 2,354,123.

This invention relates to coatings containing magnesium oxide/magnesium hydroxide, at least one amorphous magnesia-silica complex and at least one lithium compound which when applied to silicon sheet steel impart superior insulation qualities to the silicon steel after the final high temperature anneal in addition to serving as a separator coating for the sheet material during heat treatment and aiding in the purification of the magnetic material.

In addition to conventional silicon steel, the compositions of the invention find applicability in the coating of steels of high permeability that have recently become of interest, particularly in the electrical industry. Examples of steels of this type include those reported in U.S. Pat. No. 3,676,227.

The amorphous magnesia-silica complexes of the invention include those materials wherein the mole ratio expressed as $MgO:SiO_2$ may vary from about 1:25 to 14:1. The complexes of the invention contain from about 0.001 to 2.0 percent by weight of an alkali metal oxide or hydroxide. Representative of the alkali metals that may be employed in the practice of the invention are sodium, lithium, potassium and the like. Of particular preference are the amorphous (i.e., non-crystalline) magnesia-silica complexes having a molar ratio of $MgO:SiO_2$ of from about 1:13 to 7:1 and from about 0.01 to 1.0 percent by weight of alkali metal oxide or hydroxide. An example of a complex that has highly desirable properties is one having a $MgO:SiO_2$ molar ratio of 1:1.6 and from 0.05 to 0.4% by weight of sodium oxide. Of particular interest are those complexes wherein the sodium oxide content is from 0.1 to 0.2% by weight.

Insofar as the alkali metal is concerned, it should be noted that, although the alkali metal oxide or hydroxide is expressed throughout the specification and claims as a component of the magnesia-silica complex, one skilled in the art will readily appreciate that the alkali metal oxide or hydroxide may be provided from a source separate from the magnesia-silica complex. For example, the appropriate level of alkali metal oxide or hydroxide may be provided by either the complex per se or where a complex free of alkali metal oxide or hydroxide is utilized, any convenient source of alkali metal oxide or hydroxide may be employed in combination with the magnesia-silica complex to insure that the coating composition contains the appropriate level of alkali metal oxide or hydroxide. Included among the materials that may be used in the practice of the invention to provide the alkali metal oxide or hydroxide are carbonates and the like. In summary, the alkali metal oxide or hydroxide component may be included as a component of the complex or made available from either the MgO or an independent source such as carbonates as discussed above.

As set forth in U.S. application Ser. No. 267,276, filed Jan. 29, 1972, and now abandoned, magnesia-silica complexes of the invention may be conveniently prepared by the precipitation reaction between a solution of a magnesium salt such as $MgCl_2$, $MgSO_4$ or $Mg(NO_3)_2$ and a solution of silicate salt such as an alkali metal silicate (e.g., sodium silicate, or potassium silicate). The alkali metal silicates that may be employed as reactants include those wherein the mole ratio of alkali metal (M) to silicate is 1:25 to 14:1 expressed as $M_2O:SiO_2$.

As indicated previously, amorphous magnesia-silica complexes which do not contain the alkali metal oxide or hydroxide may be employed in the practice of the invention if the alkali metal oxide or hydroxide is provided from another source. In such cases, other soluble silicate salts may be employed in the preparation of the amorphous magnesia-silica complex. The conditions under which the precipitation reaction occurs are not critical and involve techniques well known to the art.

For example, an amorphous, magnesia-silica complex having a mole ratio of 1:2 with respect to $MgO:SiO_2$ may be prepared by a precipitation process employing an alkali metal silicate having a mole ratio of 1:2 with respect to the $M_2O:SiO_2$ in the presence of excess magnesium salt.

In addition to the above, other procedures that may be employed in the preparation of the novel magnesia-silica complexes of the invention are as follows:

1. Magnesia is precipitated by reacting $MgCl_2$ or $MgSO_4$ with NaOH or dolomite or $Ca(OH)_2$ to form $Mg(OH)_2$.
2. Silica is prepared by acidifying sodium silicate or any alkaline silicates.
3. The two slurries are combined in a wet state to afford an intimate mix, filter off the impurities by washing, extraction.
4. The product is dried in a suitable drier. Another convenient method of preparation is as follows:

1. Sodium hydroxide and magnesium chloride or sulfate are reacted to form $Mg(OH)_2$.
2. Mix the $Mg(OH)_2$ slurry with sodium silicate.
3. React 2 with hydrochloric acid to form the magnesia-silica complex.
4. Filter and wash off NaCl or $Na_2SO_4$ impurities.
5. The filter cake is dried in a suitable drier.

The amorphous property of the magnesia-silica complex is apparent from a consideration of the X-ray diffraction pattern of representative magnesia-silica complexes of the invention. In Table I, X-ray powder diffraction data of the magnesia-silica complexes are reported. In order to illustrate the uniqueness of the magnesia-silica complex, the X-ray powder diffraction patterns were obtained for prior art colloidal silica, MgO-colloidal silica compositions and fibrous magnesium silicate. These prior art materials have been taught for use in the coating of silicon steels.

The d-spacings and hkl planes (Miller Indices) of the materials tested are reported including an identification of the crystalline structure, where appropriate.

The X-ray diffraction studies were conducted in an X-ray diffractometer under the following conditions:

| | Formulation | X-Ray Radiation Source | Filter | Voltage | Current |
|---|---|---|---|---|---|
| a. | Magnesia-silica Complex (Example 1) | CuKα | None | 40 KV | 22 MA |
| b. | Magnesia-silica Complex (Example 2) | CuKα | None | 40 KV | 22 MA |
| c. | Magnesia-silica Complex (Mole Ratio-1.7:1) | CuKα | None | 40 KV | 22 MA |
| d. | Magnesia-silica Complex (mole Ratio-1:1.5) | CuKα | Ni | 40 KV | 20 MA |
| e. | Magnesia-silica Complex (Example 8) | CuKα | Ni | 40 KV | 20 MA |
| f. | Magnesia-silica Complex (Mole Ratio-1:1.6) | CuKα | Ni | 40 KV | 20 MA |
| g. | Colloidal Silica (LUDOX) | CuKα | Ni | 40 KV | 20 MA |
| h. | Colloidal Silica + MgO (1:1 by weight) | CuKα | Ni | 40 KV | 20 MA |
| i. | Colloidal Silica + MgO (1:4 by Weight) | CuKα | Ni | 40 KV | 20 MA |
| j. | Fibrous Magnesium Silicate | CuKα | Ni | 40 KV | 20 MA |
| k. | Fibrous magnesium Silicate | CuKα | Ni | 40 KV | 20 MA |

The techniques used in these studies followed the commonly accepted Debye-Scherrer Method as described in Klug & Alexander's X-Ray Diffraction Procedures for Polycrystalline and Amorphous Materials (Wiley, 1954) pp. 206–209.

TABLE I

| | | d (A) | Miller Indices (hkl) | Identified Crystalline Structure |
|---|---|---|---|---|
| a. | Magnesia Silica Complex $MgO:SiO_2$ mole ratio = 1:1.6 and contains .774% $Na_2O$ (Example 1) | — | — | Amorphous |

TABLE I-continued

| | d (A) | Miller Indices (hkl) | Identified Crystalline Structure | |
|---|---|---|---|---|
| b. Magnesia Silica Complex MgO:$SiO_2$ mole ratio = 1:1.6 heated at 1000°C. for 3 minutes (Example 2) | 1.607 | 531 | Clinoenstatite | Mostly Amorphous |
| | 2.5 | 131 | Enstatite | |
| | | 202 | Clinoenstatite | |
| | 2.87 | 610 | Enstatite | |
| | | 310 | Clinoenstatite | |
| | 2.98 | 221 | Clinoenstatite | |
| | 3.17 | 420 | Enstatite | |
| | | 220 | Clinoenstatite | |
| | 3.30 | 121 | Enstatite | |
| | | 021 | Clinoenstatite | |
| c. Magnesia Silica Complex MgO:$SiO_2$ mole ratio = 1.7:1 | — | — | Amorphous | |
| d. Magnesia Silica Complex MgO:$SiO_2$ mole ratio = 1:1.5 | 3.229 | — | | |
| | 2.5902 | — | Amorphous | |
| e. Magnesia Silica Complex MgO:$SiO_2$ mole ratio = 1:1.6 and contains 0.20% $Na_2O$ (Example 8) | 2.829 | — | | |
| | 2.5902 | — | Amorphous | |
| | 1.545 | — | | |
| f. Magnesia Silica Complex MgO:$SiO_2$ mole ratio = 1:1.6 | — | — | Amorphous | |
| g. Colloidal Silica (Ludox) | 4.07 | 101 | α-cristobalite | |
| h. Colloidal Silica + MgO 1 to 1 ratio by weight | 4.776 | 001 | Magnesia | |
| | 2.728 | 100 | Magnesia | |
| | 2.366 | 101 | Magnesia | |
| | 1.792 | 102 | Magnesia | |
| | 1.574 | 110 | Magnesia | |
| | 1.493 | 111 | Magnesia | |
| | 1.373 | 103 | Magnesia | |
| | 1.310 | 201 | Magnesia | |
| i. Colloidal Silica + MgO, 1:4 ratio by weight | 4.760 | 001 | Magnesia | |
| | 2.720 | 100 | Magnesia | |
| | 2.360 | 101 | Magnesia | |
| | 1.789 | 102 | Magnesia | |
| | 1.569 | 110 | Magnesia | |
| | 1.491 | 111 | Magnesia | |
| | 1.370 | 103 | Magnesia | |
| | 1.309 | 201 | Magnesia | |
| j. Fibrous Magnesium Silicate | 4.766 | 001 | Magnesia | |
| | 4.548 | 020 | Serpentine ($3MgO.\ 2SiO_2.\ 2H_2O$) | |
| | 3.660 | 0.0.12 | Serpentine | |
| | 3.336 | 029 | Serpentine | |
| | 2.966 | 0.2.11 | Serpentine | |
| | 2.527 | — | — | |
| | 2.499 | 206 | Serpentine | |
| | 2.453 | 0.2.15 | Serpentine | |
| | 2.372 | 209 | Serpentine | |
| | 2.154 | 2.14.9 | Serpentine | |
| | 2.097 | 2.0.15 | Serpentine | |
| | 1.799 | 2.0.18 | Serpentine | |
| | 1.617 | 2.0.21 | Serpentine | |
| | 1.536 | 060 | Serpentine | |
| | 1.507 | 2.0.24 | Serpentine | |
| | 1.485 | 220 | Magnesia | |
| k. Fibrous Magnesium Silicate (6 layers ortho type) | 7.310 | 006 | Serpentine ($3MgO.\ 2SiO_2.\ 2H_2O$) | |
| | 4.766 | 001 | Magnesia | |
| | 4.570 | 020 | Serpentine | |
| | 4.227 | 024 | Serpentine | |
| | 3.660 | 0.0.12 | Serpentine | |
| | 2.506 | 206 | Serpentine | |
| | 2.372 | 209 | Serpentine | |
| | 1.796 | 2.0.18 | Serpentine | |
| | 1.538 | 060 | Serpentine | |

The colloidal silica reported in formulations (g), (h) and (i) above is commercially available under the name of "LUDOX" and is a product of E. I. du Pont de Nemours and Company and is taught as a coating material for silicon steel in U.S. Pat. No. 2,809,137. Formulation (h) was prepared according to U.S. Pat. No. 2,809,137 (Col. 3, lines 60–65). Formulation (i) was prepared according to U.S. Pat. No. 2,809,137 (Col. 3, lines 66–70).

The fibrous magnesium silicates reported in formulations (j) and (k) correspond to the fibrous magnesium silicate disclosed in U.S. Pat. No. 3,562,029 as useful in the coating of silicon steel.

The studies reported in Table I indicate that the magnesia-silica complexes of the invention are amorphous, whereas the prior art materials (colloidal silica, colloidal silica + MgO, and fibrous magnesium silicate) are crystalline in nature.

The thermal behavior of the novel magnesia-silica complexes of the invention in a Differential Thermal Analyzer (DTA) have been studied. In addition, a study of the Differential Thermal Analysis of the following prior art coating materials was conducted: commercial steel grade MgO, colloidal silica, colloidal silica + MgO, fibrous magnesium silicate, commercial steel grade MgO + fibrous magnesium silicate. Also included within the study is the DTA of a composition within the scope of the invention — commercial steel grade MgO and the novel magnesia-silica complex.

The Differential Thermal Analyses of the materials studied were conducted under the following conditions:

atmosphere:air, 760 MM
reference:alumina
heating rate:10°C./min.
starting temperature:room temperature differential THERMAL ANALYSIS A. The novel magnesia-silica complexes of the invention exhibit the following thermal behavior characteristics:

a. endothermic peak at about 250°C.;
b. exothermic peak at about 820°C.;
c. exothermic peak at about 980°C.

B. Commercial steel grade MgO + magnesia silica complex exhibits the characteristic endothermic and exothermic peaks of the magnesia-silica complex and an additional endothermic peak at about 500°C.

C. Commercial steel grade MgO exhibits one endothermic peak at 380°C.

D. Colloidal silica exhibits one endothermic peak at 160°C. and one exothermic peak at 1000°C.

E. Colloidal silica + MgO exhibits one endothermic peak at 500°C. and one exothermic peak at 835°C.

F. Colloidal silica + MgO exhibits one endothermic peak at 500°C. and one exothermic peak at 1,000°C.

G. Fibrous magnesium silicate exhibits endothermic peaks at 435° and 720°C. and one exothermic peak at 825°C.

H. Fibrous magnesium silicate + commercial grade MgO exhibits endothermic peaks at 465° and 690°C. and one exothermic peak at 830°C.

The colloidal silica reported in formulations D, E, and F is commercially available under the name of LUDOX — a product of E. I. du Pont de Nemours and Company and is taught as a coating material for silicon steel in U.S. Pat. No. 2,809,137. Formulation E was prepared according to U.S. Pat. No. 2,809,137 (Col. 3, lines 60–65). Formulation F was prepared according to U.S. Pat. No. 2,809,137 (Col. 3, lines 66–70).

The fibrous magnesium silicates reported in formulations G and H correspond to the fibrous magnesium silicate disclosed in U.S. Pat. No. 3,562,029 as useful in the coating of silicon steel.

Although the exact endothermic and exothermic reaction temperatures of the novel magnesia-silica complex were disclosed in this application, one skilled in the art would appreciate that minor variations from these exact thermal reaction temperatures are within the scope of our invention.

Representative members of the class of organic and inorganic lithium bearing compounds that are employed in the practice of the invention includes the following:

lithium acetate
lithium borate, such as lithium metaborate, lithium metaborate hydrate, lithium pentaborate, lithium tetraborate and lithium borohydrate
lithium chromate
lithium fluoride
lithium hydroxide
lithium nitrate
lithium phosphate
lithium silicate
lithium sulfate
lithium hydroxide monohydrate
lithium carbonate
lithium metaaluminate
lithium bromide
lithium bromide, dihydrate
lithium carbide
lithium bicarbonate
lithium chlorate
lithium chlorate hydrate
lithium chloride
lithium chloride monohydrate
lithium bichromate dihydrate
lithium dichromate
lithium citrate
lithium fluosilicate
lithium fluosulfonate
lithium formate monohydrate
lithium iodate
lithium iodide
lithium iodide, trihydrate
lithium permanganate
lithium molybdate
lithium nitrate trihydrate
lithium nitride
lithium nitrite
lithium oxalate
lithium acid oxalate
lithium oxide
lithium metaphosphate
lithium orthophosphate
lithium orthophosphate hydrate
lithium dihydrogen phosphate
lithium metasilicate
lithium orthosilicate
lithium sulfate
lithium hydrogen sulfate
lithium sulfate monohydrate
lithium sulfide
lithium hydrosulfide
lithium sulfite monohydrate
lithium dithionate
lithium tungstate
lithium titanate
lithium manganite
lithium vanadate
lithium cobaltite
and the like.

Additional lithium compounds that may be employed in the practice of the invention are set forth in U.S. Pat. No. 3,697,322, the contents of which are incorporated herein by reference.

It will be appreciated that lithium compounds which have a relatively high weight percent of lithium are preferred for use in the instant invention since the anion portion of the lithium compound (assuming it to be a salt) would ordinarily serve no purpose. It should be emphasized, however, that any lithium compound (or mixtures of such compounds) may be utilized to obtain the advantageous function here involved since the key to this function is the presence of the lithium atom or ion.

The MgO, lithium, magnesia-silica complex mixture may be applied as a coating to silicon steel using techniques well known to the art. Among the well known procedures that may be employed include preparing the coating composition in the form of a slurry. The slurry may be applied to the magnetic sheet material in the form of a thin coating by any convenient, suitable means including art recognized techniques such as immersion, brushing or spraying. The wet coating thus applied is dried by suitable means. The coated silicon steel in usually wound or stacked condition. is placed in an annealing furnace. A convenient and effective coating technique involves passing a continuous strip of the material to be coated through a bath containing a suspension of the coating composition followed by subjecting the coated material to a drying furnace.

The concentration of magnesia-silica complex with respect to the amount of the MgO employed in the coating (exclusive of additive) is not critical and may vary from about 2 to about 200 parts by weight per 100 parts by weight of magnesium oxide. A satisfactory concentration for most practical purposes has been found to be from about 10 to 50 parts by weight of magnesia-silica complex per 100 parts by weight of MgO.

The concentration of the lithium bearing compound calculated as $Li_2O$ with respect to the amount of the MgO employed in the coating is not critical and may vary from about 0.01 to about 30 parts by weight per 100 parts by weight of the magnesium oxide. A satisfactory concentration for most practical purposes (calculated as $Li_2O$) has been found to be from about 0.05 to 12.5 parts per 100 parts of MgO. It should be noted that the particular grade of MgO to be utilized is not critical and any commercially available MgO may be employed in the practice of the invention.

Where the coating is applied to the steel in the form of a slurry, the concentration of the lithium, magnesia-silica complex-MgO combination in the coating slurry is not critical and may vary from about 1 to about 50% by weight of the slurry. A particularly effective concentration is from 2–20% by weight of the slurry. In addition to employing conventional coating techniques, the amount of $MgO/Mg(OH)_2$ (exclusive of lithium and magnesia-silica complex additive) that is applied to the silicon steel in the practice of this invention is similar to those amounts that heretofore had been employed in $MgO/Mg(OH)_2$ coatings and in general will vary from about 0.020 to 0.070 ounces of MgO per square foot of steel surface.

The manner and time at which the lithium and magnesia-silica silica complex are combined with the magnesium oxide is not critical. For example, the lithium compound can be effectively added to; (1) the MgO-magnesia-silica complex mixture, (2) blended in with the MgO and then mixed with the magnesia-silica complex, and (3) mixed with the magnesia-silica complex before drying and then blended with MgO. These procedures include adding the lithium compound and the magnesia-silica complex to a magnesium material, such as magnesium basic carbonate or $Mg(OH)_2$, prior to their conversion to the magnesium oxide; blending the lithium material and complex with the MgO or $Mg(OH)_2$ or mixing the lithium material and the complex in the water used for coating slurry make-up prior to the addition of the MgO powder.

The annealing of the silicon steel that has previously been coated with the coating composition of the invention may be carried out in a neutral or reducing atmosphere at temperatures ranging from approximately 950° to 1500°C. for from about 2 to 50 hours using techniques well known to the art.

The unobvious properties of the instant invention are readily apparent when it is appreciated that commercially available steel grade magnesium oxides in current use in the grain-oriented silicon steel industry give relatively low resistances of the order of 1–4 ohm-cm$^2$ according to the Franklin Test (ASTM-A344-60T), a widely used test that is utilized in the steel industry to determine the surface insulation characteristics of refractory films. However, the identical MgO material containing the lithium and an amorphous magnesia-silica complex resulted in a considerably higher insulation (e.g. 274 ohm-cm$^2$) by the identical Franklin test, with many coated areas of the steel having complete insulation (infinate resistance).

It may be noted that the current practice of the steel industry in its attempt to improve insulation involves using an expensive and time consuming phosphate coating after the annealing step. This is done to improve the insulation from 2–4 ohm-cm$^2$ to a minimum of about 20 ohm-cm$^2$. By using the novel coating compositions of the invention, a cost reduction in processing silicon steel is anticipated since the phosphate coating can be eliminated or at least reduced to a more easily controlled step.

It should be noted that, in addition to silicon steel, materials such as nickel-iron alloys, common iron and other ferromagnetic substances may be effectively coated in accordance with the practice of the invention.

One skilled in the art will appreciate that refractory oxides other than MgO may be employed. For example, refractory oxides and hydroxides such as $Al_2O_3$, $Al(OH)_3$, CaO, $Ca(OH)_2$, $TiO_2$, $MnO_2$, ZnO, BeO, $Cr_2O_3$, $SiO_2$, $ThO_2$, $ZrO_2$, FeO and the like may be employed in place of or in combination with MgO.

A representative example of the preparation of a magnesia-silica complex for use in the coating composition of the invention is as follows:

EXAMPLE 1

Two solutions are prepared as follows:

a. A magnesium chloride solution having a concentration of 213 grams of $MgCl_2$ per liter is prepared from $MgCl_2.6H_2O$ crystals.
b. A 12% solution of sodium silicate is prepared having a mole ratio of $Na_2O:SiO_2$ of 1:1.6.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 0.4–2.1 g. $MgCl_2$/l excess by varying the flow of $MgCl_2$ solution. The slurry after stirring for 10 hours is filtered with a leaf filter and washed with 45°C. city water, dried at 220°–250°F. for 12 hours and hammermitted to a fine powder. The resultant magnesia-silica complex has a $MgO:SiO_2$ mole ratio of 1:1.6. Analysis of the complex is as follows:

| | |
|---|---|
| MgO | 25.0% |
| $SiO_2$ | 59.8% |
| Loss on ignition | 15.3% |
| Na | 0.03 |
| Bulk density | 0.74 g/cc |

X-ray diffraction analysis reveals that the product is completely amorphous indicating that it is a magnesia-silica complex rather than a crystalline form of MgO, silica or silicate. Differential thermal analysis followed by X-ray diffraction analysis of this material at temperatures from 20° to 1200°C. showed primarily an amorphous state with a poorly defined clinoenstatite phase at about 820°C.

EXAMPLE 2

The magnesia-silica complex prepared in Example 1 is heated in a muffle furnace at 1,000°C. for 3 minutes. X-ray diffraction analysis reveals that this material is largely amorphous.

EXAMPLE 3

Two solutions are prepared as follows:

1. A magnesium chloride solution is made by dissolving 454 g. of $MgCl_2.6H_2O$ in 1000 ml. of deionized water. The concentration of this solution is 213 g. $MgCl_2$/l.
2. A sodium silicate solution is prepared having a concentration of 12% solids and a mole ratio of $Na_2O:SiO_2$ of 1.7:1.

The two solutions are reacted according to the procedure of Example 1. The excess $MgCl_2$ measured is 1.75 g $MgCl_2$/l. The resultant magnesia-silica complex has a $MgO:SiO_2$ mole ratio of 1.7:1.
Analysis of the complex shows:

| | |
|---|---|
| MgO | 42.5% |
| $SiO_2$ | 37.7% |
| Loss on Ignition | 19.8% |
| NaCl | 0.16% |
| Bulk density | 0.31 g/cc |

EXAMPLE 4

Two solutions are prepared as follows:

1. The magnesium chloride solution used in Example 1.
2. A sodium silicate solution having a concentration of 12% solids and a mole ratio of $Na_2O:SiO_2$ of 13:1.

The two solutions are reacted according to the procedure described in Example 1. The excess $MgCl_2$ measured is 1.92 g $MgCl_2$/l. The resultant magnesia-silica complex has a $MgO:SiO_2$ mole ratio of 13:1.
Analysis of the complex shows:

| | |
|---|---|
| MgO | 63.2% |
| $SiO_2$ | 7.1% |
| Loss on Ignition | 29.7% |
| Na | 0.16% |
| Bulk density | 0.35 g/cc |

EXAMPLE 5

Two solutions are prepared as follows:

1. The magnesium chloride solution used in Example 1.

2. A sodium silicate solution having a concentration of 12% solids and a mole ratio of $Na_2O:SiO_2$ of 1:2.7.

The two solutions are reacted according to the procedure described in Example 1. The excess $MgCl_2$ measured is 1.65 g $MgCl_2$/l. The resultant magnesia-silica complex has a $MgO:SiO_2$ mole ratio of 1:2.7. Analysis of the complex shows:

| | |
|---|---|
| MgO | 16.5% |
| $SiO_2$ | 67.6% |
| Loss on Ignition | 14.9% |
| Na | 0.80% |
| Bulk density | 0.26 g/cc |

EXAMPLE 6

Two solutions are prepared as follows:

1. An acidified magnesium chloride solution is prepared by adding 12.6 moles of hydrochloric acid to 1 mole of magnesium chloride. The concentration is expressed as 213 g. $MgCl_2$/l.
2. A sodium silicate solution having mole ratio of $Na_2O:SiO_2$ of 1:1.6 is prepared as described in Example 1. The concentration is 12% solids.

The two solutions are reacted according to the procedure described in Example 1. The excess $MgCl_2$ as measured is expressed as 1.07 g $MgCl_2$/l. The magnesia-silica complex after being dried has a $MgO:SiO_2$ mole ratio of 1:14.2. Analysis of the powder shows:

| | |
|---|---|
| MgO | 4.2% |
| $SiO_2$ | 89.2% |
| Loss on ignition | 6.4% |
| Na | 0.47% |
| Bulk density | 0.11 g/cc |

EXAMPLE 7

Two solutions are prepared as follows:

a. Magnesium sulfate solution having a concentration of 180 g. $MgSO_4$/l equivalent is prepared by neutralizing magnesium hydroxide with sulfuric acid.
b. A sodium silicate solution having a concentration of 9% and mole ratio, $Na_2O:SiO_2$, of 1:1.6 is prepared.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 15–20 g $MgSO_4$/l excess by varying the flow of $MgSO_4$ solution. The precipitate formed is immediately diluted 1:2 with city water and filtered on a rotary vacuum filter. A 7-minute cycle is used on the filter with slurry at the overflow level. City water at 35°C. was used for washing. The filter cake after washing is dried at 500°F. for 6–12 hours. The resulting magnesia-silica complex has a $MgO:SiO_2$ mole ratio of 1:1.6.
Analysis of the complex is as follows:

| | |
|---|---|
| MgO | 25.9% |
| $SiO_2$ | 59.6% |
| Ignition loss | 11.3% |
| Na | 0.08% |
| $SO_4$ | 0.007% |

EXAMPLE 8

Two solutions are prepared as follows:

a. Magnesium sulfate solution having a concentration of 180 g $MgSO_4$/l is prepared by neutralizing magnesium hydroxide with sulfuric acid.

b. A sodium silicate solution having a concentration of 9% and mole ratio, $Na_2O$:$SiO_2$, of 1:1.6 is prepared.

The two solutions (a) and (b) are reacted by simultaneously pumping into a reactor vessel (1 gallon capacity) equipped with an overflow spout. The flow rate of each stream is kept at 0.5–0.8 gallons per minute (gpm) with a combined flow rate of 1–1.5 gpm. The slurry is kept at 15–20 g $MgSO_4$/l excess by varying the flow of $MgSO_4$ solution. The precipitate formed is immediately diluted 1:2 with city water and filtered on a rotary vacuum filter. A 7-minute cycle is used on the filter with slurry at the overflow level. City water at 35°C. was used for washing. The filter cake after washing is dried at 500°F. for 6–12 hours. The resulting magnesia-silica complex has a MgO:$SiO_2$ mole ratio of 1:1.6.

Analysis of the complex is as follows:

| | |
|---|---|
| MgO | 25.9% |
| $SiO_2$ | 59.6% |
| Ignition loss | 11.3% |
| Na | 0.15% |
| $SO_4$ | 0.007% |

Additional procedures for the preparation of magnesia-silica complexes to be employed in the practice of the invention are set forth in U.S. Pat. application Ser. No. 267,276, said procedures being incorporated herein by reference.

Representative compositions of lithium material and a magnesia-silica complex in combination with MgO that may be employed in the practice of the invention are as follows:

a. 10 parts by weight of $Li_2CO_3$ (4.0 as $Li_2O$) and 35 parts by weight of complex having an MgO:$SiO_2$ mole ratio of 1:1.6 per 100 parts by weight of MgO.

b. 8 parts by weight of LiOH (5.0 as $Li_2O$) and 180 parts by weight of complex having an MgO:$SiO_2$ mole ratio of 7:1 per 100 parts by weight of MgO.

c. 0.5 parts by weight of LiF (0.3 as $Li_2O$) and 5 parts by weight of complex having an MgO:$SiO_2$ mole ratio of 1:20 per 100 parts by weight of MgO.

d. 5 parts by weight of $LiBO_2$ (1.5 as $Li_2O$) and 3 parts by weight of complex having an MgO:$SiO_2$ mole ratio of 1:25 per hundred parts by weight of MgO.

e. 10 parts by weight of $LiC_2H_3O_2$ (1.5 as $Li_2O$) and 200 parts by weight of complex having an MgO:$SiO_2$ mole ratio of 12:1 per 100 parts by weight of MgO.

The unobvious and unexpected properties of the novel coating compositions of the invention are clearly evident from a consideration of the following resistivity studies wherein a composition of the invention is tested and the insulation produced is compared with that achieved by a commercial steel grade MgO by itself.

EXAMPLE 9 a. A coating slurry is made by mixing in a Waring Blender 60 g. of a commercial steel grade MgO, 12 g. of the amorphous magnesia-silica complex prepared in Example 1 and 1.5 grams of lithium hydroxide monohydrate and 600 ml. of deionized water. The concentration of the slurry is approximately 1 lb. of solids per gallon. The mixture is allowed to stand to stabilize the viscosity. The resulting slurry is coated onto silicon steel strips (size 3 cm. × 30.5 cm.) at a coating weight of 0.061 oz./ft.$^2$ based upon MgO and dried at 250°–270°C. The coated strips are then box-annealed in hydrogen atmosphere for 30 hours at 1200°C.

b. For comparative purposes a coating slurry is prepared according to the procedure (a) above having a concentration of 1 lb. of solids per gallon but containing only the commercial steel grade MgO of (a). Identical steel strips are coated as in (a).

After annealing and cooling, the excess coating was scrubbed off all samples with a nylon brush and a cloth. These strips were tested for resistance on both surfaces with a Franklin tester (ASTM-A344-60T). The results are as follows:

| | COATING MATERIAL | RESISTIVITY (ohm-cm$^2$) |
|---|---|---|
| (a) | MgO, magnesia-silica complex, LiOH | 274 |
| (b) | MgO | 4.6 |

EXAMPLE 10

An unobvious and unexpected improvement of the novel coating compositions of the invention is that a lower coating weight can be used to achieve the desired improvement in resistivity. Thus, a further cost reduction in processing silicon steel is anticipated by using the novel compositions. The following experiment clearly demonstrates the advantages of using the novel coating compositions.

a. A coating slurry is made by mixing in a Waring blender a product containing 39 g. of a commercial steel grade MgO and 21 g. of the amorphous magnesia-silica complex prepared in Example 1 and 500 ml. of deionized water. The concentration of the slurry is approximately 1 lb. of solids per gallon. The mixture is allowed to stand to stabilize the viscosity. The resulting slurry is coated onto silicon steel strips (size 3 cm × 30.5 cm.) at a coating weight of 0.041 oz./ft.$^2$ and dried at 250°–270°C. The coated strips are then box-annealed in hydrogen atmosphere for 30 hours at 1200°C.

b. A coating slurry is prepared according to procedure (a) above and having a concentration of 1.5 lbs. of solids per gallon. Identical product and steel strips are used. The coating weight is 0.082 oz./ft.$^2$.

c. A coating slurry is prepared according to procedure (a) above and having a concentration of 2 lbs. of solids per gallon. Identical product and steel strips are used. The coating weight is 0.151 oz./ft.$^2$.

d. A coating slurry is prepared according to procedure (a) above and having a concentration of 1 lb. of solids per gallon. 3 G. of lithium hydroxide monohydrate ($LiOH.H_2O$) is added to the mixture. Identical MgO, magnesia-silica complex are used and identical steel strips are coated as in (a).

e. and f. For comparative purposes, coating slurries are prepared according to procedure (a) above having concentrations of 1 and 1.5 lb. of solids per gallon, respectively, but containing only the commercial steel grade MgO of (a). Identical steel strips are coated as in (a).

After annealing and cooling, the excess coating is scrubbed off all samples with a nylon brush and a cloth. These strips are tested for resistivity on both surfaces with a Franklin tester (ASTM-A344-60T). The results are as follows:

| Coating Material | Coating Bath Concentration | Coating Weight oz/ft.[2] | Resistivity ohm-cm[2] |
|---|---|---|---|
| (a) MgO, magnesia-silica complex | 1 lb/gal | 0.041 | 7.6 |
| (b) MgO, magnesia-silica complex | 1.5 lb/gal | 0.082 | 30.6 |
| (c) MgO, magnesia-silica complex | 2 lb/gal | 0.151 | 47.7 |
| (d) MgO ($LiOH.H_2O$) magnesia-silica complex | 1 lb/gal | 0.037 | 380.6 |
| (e) MgO | 1 lb/gal | 0.055 | 3.3 |
| (f) MgO | 1.5 lb/gal | 0.096 | 4.0 |

The above experiments unequivocally demonstrate that magnesium oxide currently employed to coat grain-oriented silicon steel gives relatively low resistance whereas the identical MgO coating containing a lithium material and an amorphous magnesia-silica complex results in the production of a film having a considerably higher resistance. Comparable results to that indicated above are achieved employing other representative lithium materials and non-crystalline magnesia-silica complexes encompassed within the scope of the invention.

Although specific embodiments of the invention have been described herein, it is not intended to limit the invention solely thereto but to include all of the obvious variations and modifications within the spirit and scope of the appended claims.

What is claimed is:

1. A composition for coating magnetic ferrous material prior to the step of annealing said material comprising MgO, $Mg(OH)_2$ or mixtures thereof, at least one lithium compound and at least one magnesia-silica complex containing from about 0.001 to 2.0% by weight of an alkali metal oxide or hydroxide wherein the mole ratio of the $MgO:SiO_2$ is from about 1:25 to 14:1, said magnesia-silica complex being amorphous as indicated by its X-ray powder diffraction pattern and exhibiting the following differential thermal behavior characteristics: an endothermic peak at about 250°C., an exothermic peak at about 820° and at about 980°C.

2. The composition of claim 1 wherein the magnesia-silica complex has a $MgO:SiO_2$ mole ratio of from about 1:13 to 7:1 and the alkali metal oxide or hydroxide is from about 0.01 to 1.0% by weight of the magnesia-silica complex and the lithium compound is selected from the group consisting of lithium carbonate, lithium hydroxide, lithium fluoride, lithium borate, lithium sulfate, lithium oxide, lithium lactate, lithium phosphate, lithium silicate, lithium dichromate, and lithium nitrate.

* * * * *